(12) United States Patent
Levit

(10) Patent No.: US 7,478,253 B2
(45) Date of Patent: Jan. 13, 2009

(54) REDUCTION OF POWER CONSUMPTION IN ELECTRICAL DEVICES

(75) Inventor: Maxim Levit, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 10/849,771

(22) Filed: May 21, 2004

(65) Prior Publication Data

US 2005/0258894 A1 Nov. 24, 2005

(51) Int. Cl.
*G06F 1/32* (2006.01)
*G06F 1/26* (2006.01)

(52) U.S. Cl. ............... 713/320; 713/300; 713/310; 713/321; 713/322; 713/323; 713/324; 713/330; 713/340

(58) Field of Classification Search .......... 713/300, 713/310, 320–324, 330, 340
See application file for complete search history.

(56) References Cited

U.S. PATENT DOCUMENTS

| | | | | |
|---|---|---|---|---|
| 5,502,838 A | * | 3/1996 | Kikinis ................. | 713/501 |
| 5,995,434 A | * | 11/1999 | Ryu ....................... | 365/222 |
| 6,047,248 A | * | 4/2000 | Georgiou et al. ........ | 702/132 |
| 7,036,030 B1 | * | 4/2006 | Altmejd ................. | 713/322 |
| 7,100,061 B2 | * | 8/2006 | Halepete et al. ........ | 713/322 |
| 2004/0128566 A1 | * | 7/2004 | Burr et al. ............. | 713/300 |
| 2005/0114725 A1 | * | 5/2005 | Patel et al. ............ | 713/500 |
| 2006/0206738 A1 | * | 9/2006 | Jeddeloh et al. ........ | 713/320 |

OTHER PUBLICATIONS

SIMM, What is SIMM [online], Apr. 23, 2003, [Retrieved on Mar. 16, 2007]. Retrieved from the Internet: <URL: http://www.webopedia.com/TERM/S/SIMM.html>.*

* cited by examiner

*Primary Examiner*—Nitin C Patel
*Assistant Examiner*—Fahmida Rahman
(74) *Attorney, Agent, or Firm*—Venable LLP; James R. Burdett; Catherine M. Voorhees

(57) ABSTRACT

Reducing power to a minimum permissible value based on temperature of a component may permit savings in power consumption.

23 Claims, 3 Drawing Sheets

REDUCTION OF POWER CONSUMPTION IN ELECTRICAL DEVICES

FIELD OF THE INVENTION

Some embodiments of the present invention relate to performance control of electrical devices and, more specifically, to improving the performance of electrical components by reducing power consumption at an idle state, such as a sleep or low power state.

BACKGROUND OF THE INVENTION

In order to preserve energy of electronic devices, which may or may not be mobile, leakage current, and the corresponding leakage power reduction, needs to be addressed. This is especially true for electronic devices in mobile platform applications, such as notebook computers, cellular radiotelephone communication systems, two-way radio communication systems, one-way pagers, two-way pagers, personal communication systems (PCS), Personal Digital Assistants (PDA's) or other mobile electrical devices, which rely upon batteries to keep their applications running. The leakage current of an electrical device coupled to a battery in the idle state runs the battery down, and as a result shortens the amount of power available for the full operation of the electrical device and shortens the life of the battery.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
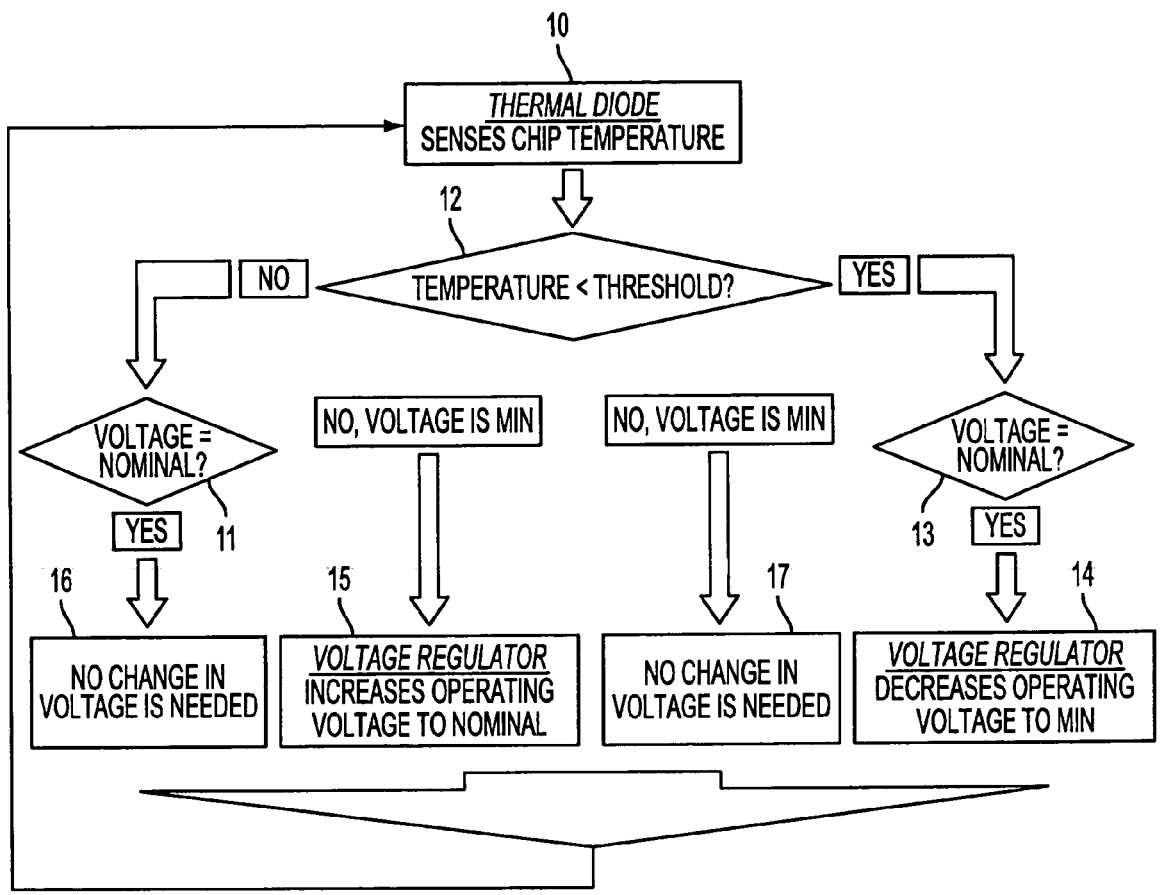
FIG. 1 shows a flow chart of the method according to an embodiment of the instant invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "exemplary embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the instant description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "processor" may refer to any electrical component or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Unless specifically stated otherwise, the terms such as "electrical component", "electronic component", "semiconductor device," "Si device," "component", "die," "chip," "IC (integrated circuit)," or the like, may be used interchangeably throughout the instant invention and refer to the similar electronic devices that may be made of Si, Si-based material, and/or other semiconductor material and intend to perform certain function with voltage applied. This certain function may include but not limited to data processing, data calculation, data transmission, data receiving, digital signal processing, data transforming, and others.

The term "component speed" may refer to the propagation delay of electrical signals within an electrical component. The proper functionality of the electrical component is guaranteed in certain range of component speed, whereas a "component speed" that is too fast or too slow may cause a functional failure of a component. Therefore, it is important to maintain the component speed in the predetermined range throughout all possible operating conditions such as component temperature, voltage applied to component, and Si material characteristics.

In general, the temperature of an electrical component (or chip) made of a silicon (Si) or of other semiconductor material and its operating voltage have an opposite impact on the speed (timing) performance of the component. For example, a higher temperature of the electrical component generally may correspond to a greater time delay or slower component speed; and a higher operating voltage of the electrical component may correspond to a smaller time delay or faster component speed. Thus, when the component temperature is decreased in an idle state (e.g., a sleep or low power state) due to less Joule self-heating or due to a drop in ambient temperature, a smaller time delay may occur which may be exploited for voltage reduction. Consequently, a reduction in power consumption of the electrical component occurs, which is desired in mobile platform applications to conserve battery power. When both the temperature of the chip and the operating voltage decrease, the impact on the time delay or component speed may be reduced or even eliminated and therefore no impact on component functionality is expected, while providing significant reduction in power consumption of the component.

Power lost due to leakage current may be significantly reduced when the voltage of the electrical component is reduced as low as it can be without compromising on performance. In order to significantly reduce the power consumption of the electrical component at its idle state while ensuring specified operating performance of the electrical component, the instant invention may reduce the operating voltage of the electrical component when the measured temperature of the electrical component (also known as Si junction temperature) drops below a predefined threshold value.

An electrical component or chip may be made of Si material or other semiconductor material having different characteristics regarding its speed. That is, the semiconductor material can be slow, moderate (typical characteristic) or fast. In slow material, the electrical signals within the component propagate slower than in the same component made of fast material at the same voltage and temperature conditions. In order to guarantee the specified component functionality in a worst case condition regarding its speed (i.e., when the speed is the slowest), the component is simulated in a so-called slow corner that may be provided with the highest allowed Si junction temperature, the lowest allowed voltage and slow Si material characteristics (Si skew).

According to the invention, since the timing performance is validated at the slow corner, there is no risk of violating timing specification and therefore affecting component functionality by reducing the operating voltage of the electrical component to some predefined minimum value, when component temperature is below the highest allowed component temperature. This minimum voltage value may be determined by direct comparison of component speed gain due to temperature drop (from the highest allowed temperature to the temperature threshold) and component speed loss due to voltage reduction to the minimum voltage as described in this invention. The following factors should be also taken into consideration while determining minimum component voltage: voltage and temperature range allowed by Si technology, the Si design library used, IR (current times resistance) voltage drop on power supplies, voltage regulator accuracy, and accuracy of thermal diode or other thermometer being used.

Looking to FIGS. 1 and 2a-b of the drawings, a flow chart of the method according to the instant invention and elements for implementing the method according to the instant invention, respectively will be described. An electrical component and/or chip 20 that may be made from a silicon, Si-germanium, Si-based component, or other semiconductor material, may be employed with means for regulating the operating voltage 22 and with means for measuring the temperature of the component and/or chip (the component temperature is also known as Si junction temperature or Si substrate temperature) 24, the output of which may be coupled to the means for regulating the operating voltage 22. The coupling or link of the temperature measuring means 24 and the operating voltage regulating means 22 may be achieved by hardware, software, firmware, etc., or a combination thereof.

Figure 2A:
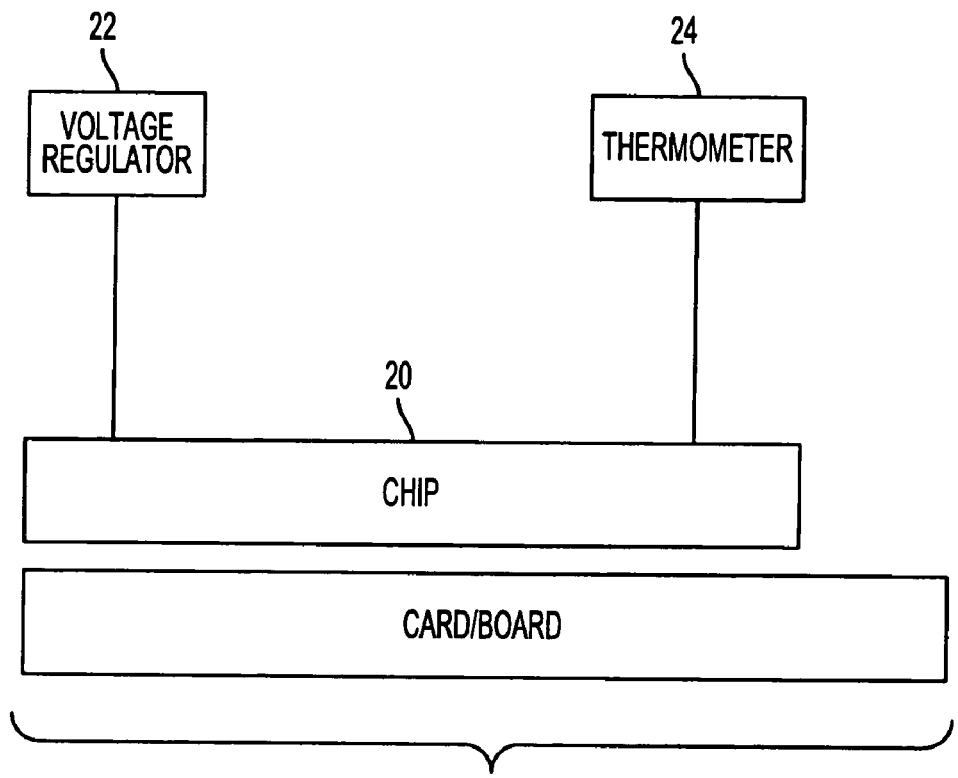
FIGS. 2a and 2b are block diagrams describing an implementation scheme and elements according to two embodiments of the instant invention.
Figure 2B:
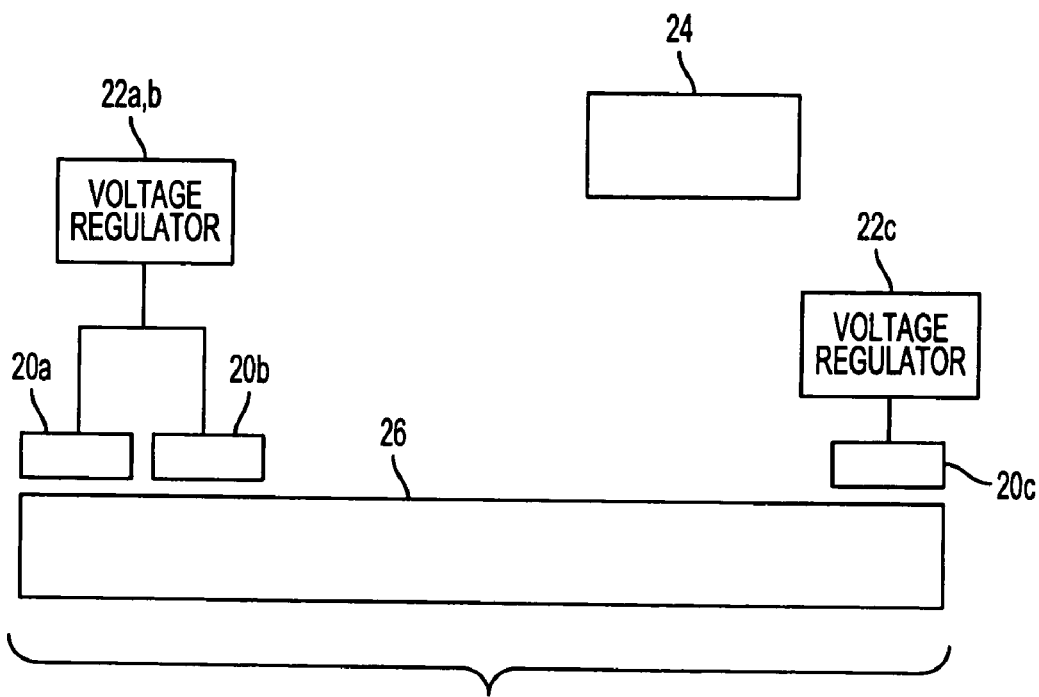

As shown in FIG. 2a, the electrical component and/or chip 20 may be disposed upon a card or board 26. In another embodiment, as illustrated in FIG. 2b, more than one electrical component and/or chip 20a-c may be situated upon a single card 26. In the case of several chips 20a-c, the implementation of the invention may be achieved with a single means for regulating the operating voltage 22a,b of more than one chip 20a and 20b. Alternatively, the voltage of each chip may be regulated individually by a chip-specific means for regulating the operating voltage 22c, or, a chip-specific means for regulating the voltage 22c may be used together with another means for regulating the voltage 22a,b of more than one chip. For example, depending upon the semiconductor material or the operating function of the chip, the nominal operating voltage as well as the minimum allowed operating voltage (per the instant invention) of each chip may be different. In this instance, chip-specific means 22c for regulating voltage may be preferred. In cases where the multiple chips have similar operating voltages, a single means for regulating voltage 22a,b may be employed. If a remote thermometer is used, a single means for measuring the temperature 24 of all of the chips 20a-c may be employed. Alternatively, each chip 20a-c may have its own thermometer (integrated thermal diode for example).

According to one embodiment of the invention, the means for measuring the component temperature may be a thermal diode. In other embodiments, the means for measuring the component temperature may be a thermocouple, thermometer or other known means for measuring a component temperature. For example, any thermal diode that may be presented in a Si design (in a silicon die or chip, for example) may be used for the means for measuring the component temperature. Alternatively, an external or remote temperature sensing system may be used for the means for measuring the component temperature. The thermal diode or other means for measuring temperature may sense or measure temperature of the component in block 10. In an exemplary embodiment, this measurement may be made when the electrical component is ON. The measured or sensed temperature may then be evaluated in a decision block 12.

If the component temperature falls below a predefined threshold temperature, the answer to decision block 12 is YES. Then, the component or chip voltage is evaluated in decision block 13. If the component voltage is nominal, this may trigger means for regulating the operating voltage 22 of the component to reduce the operating voltage to the minimum allowed value in block 14. If the component voltage evaluated by block 13 is not at a nominal value and is at its minimum value, the component voltage remains unchanged, as shown in block 17. The means for regulating the operating voltage of the component 22 may be an internal linear/switched voltage regulator, an external voltage regulator, other hardware, software or firmware, such as a computer program stored on a ROM chip that regulates the operating voltage of the component based on the measured temperature of the component or it may comprise a combination of such hardware, software and/or firmware. The minimum allowed value may depend on the application and may be validated by checking the component timing performance in slow corner of the electrical component, for example.

If the temperature of the component has not dropped below a predefined threshold value or is above the threshold temperature $t_T$, the answer to decision block 12 is NO. Then, the component voltage is evaluated at decision block 11 (similar to block 13) versus a nominal voltage value for the component. If the component voltage is nominal, no change in voltage is made at block 16. However, if the component voltage is equal to its minimum voltage value, this may trigger means for regulating the operating voltage 22 of the component to increase the operating voltage to the nominal voltage value at block 15.

Figure 3:
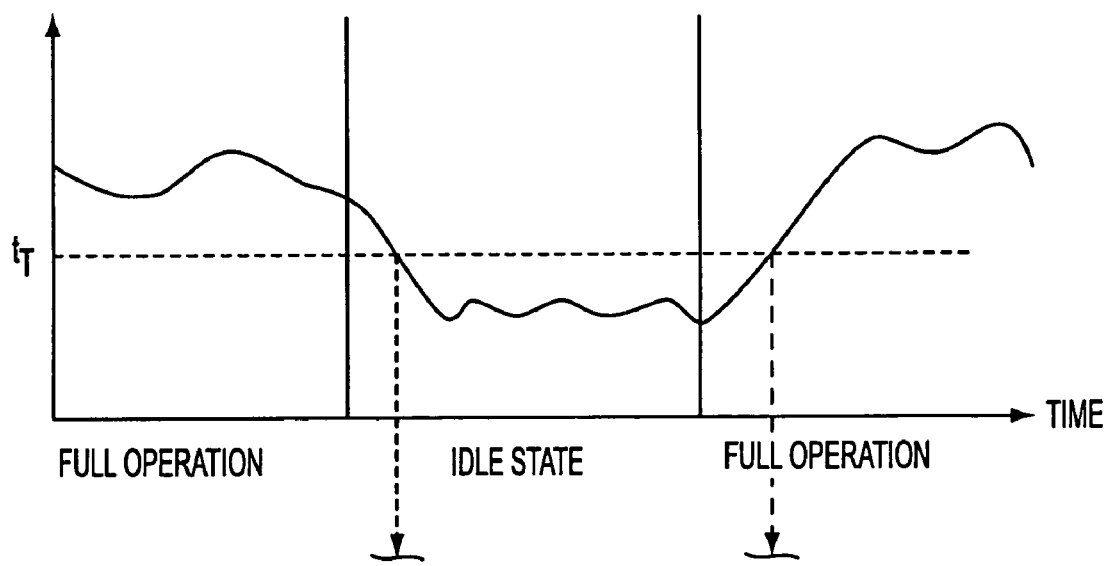
FIGS. 3 and 4 are explanatory graphs of an operating voltage of the chip and a temperature of the chip versus time, respectively.

In the idle state, the temperature of the component may approximate the temperature of its environment or ambient. Thus, as shown in FIG. 3, the temperature of the component may generally be higher when the component may be in full operation. That is, when running, the electronic or electrical component may be performing a calculation, the operating voltage may be at the nominal voltage necessary to perform the calculation, and the temperature of the component may be higher than the temperature when no operation is being performed by the component. After the component has not performed an operation for a period of time, the component may enter an idle state. When in the idle state, the temperature of the component may drop to the ambient temperature surrounding the electrical component.

As illustrated in the exemplary graph of FIG. 4, the operating voltage of the electronic or electrical component may be reduced when the temperature of the component drops below the threshold temperature $t_T$ in the idle state. The operating voltage may be constant at a nominal voltage $V_n$ (as shown in the exemplary graph of FIG. 4) or may change in some range above Vn (depending on application) until the threshold temperature $t_T$ is reached. When the means for measuring the temperature 24 of the electrical component senses a temperature below that of a predefined threshold value, the means for regulating the operation voltage of the electrical component may change the operating voltage to the lowest allowed value or minimum voltage $V_m$, as determined by the timing performance validation at slow corner of the electrical component, by the technology and by design library characterization. The following factors should be also taken into consideration while determining minimum component voltage: voltage and temperature range allowed by Si (or other semiconductor) technology, the Si design library used, IR (current times resistance) voltage drop on power supplies, voltage regulator accuracy, and accuracy of thermal diode or other thermometer being used.

It should be noted that the component temperature may drop below the predetermined threshold value not only due to idle state but also due to low ambient temperature. Similarly, in that case, the component operating voltage can also be reduced to the minimum voltage Vm.

Figure 4:
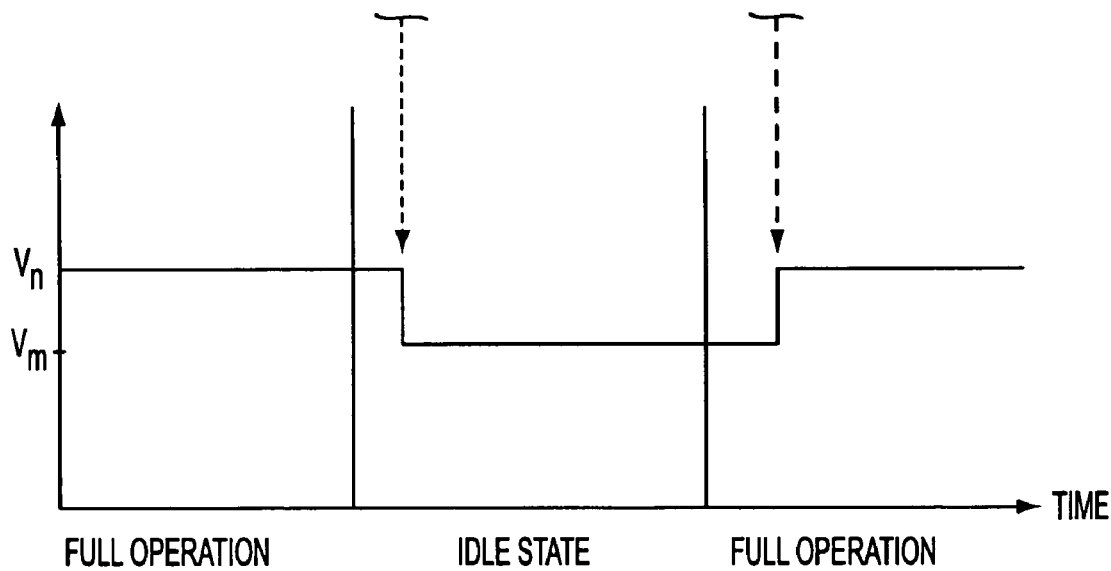

When the electrical component, returns to its normal operating mode, the operating voltage may then be changed to its nominal operating value $V_n$, as shown in FIG. 4. The return of the electrical component to its normal operating mode may also be done by sensing the temperature of the component. Looking at FIG. 3, after the idle state or low temperature state, the temperature may rise to above the predefined threshold value $t_T$. Thus, the means for measuring the temperature of the component may be used to determine when the operating voltage should be changed to its nominal value $V_n$.

According to another embodiment of the invention, actual operating voltage may be reduced up to a limit determined by the IR (current times resistance) voltage drop on power supply lines within an electrical component. That is, IR drop considerations would limit the reduction of the operating voltage. For example, if the lowest allowed operating voltage is 0.9V and the maximum expected IR drop within the electrical component is 0.03V, then the operating voltage at the idle state may be safely reduced to 0.93V. This may be about 7% reduction from the nominal operating voltage (1V). According to software simulations that provide a good indicator of silicon behavior, leakage current may decrease up to about 17% and leakage power may decrease up to about 22% at a typical slow corner (at 27° C.) with an operating voltage reduction from 1.0V to 0.95V (approximately a 5% reduction). Thus, the actual leakage current/leakage power reduction may be even greater when taking into account that the reduction of leakage current leads to a decrease in the Joule heating of the component and therefore, to an additional decrease in the temperature of the Si junction. The reduction of the operating voltage in turn significantly may reduce the sub threshold transistor current as well as the transistor gate leakage current (two main contributors to leakage current).

Consequently, the method and electrical device according to some embodiments of the invention may significantly reduce the power consumption draw from the electrical component. According to the invention, up to as much as 30% of the power reduction in the idle state as compared to the current situation when chip voltage remains constant with regard to temperature may be achieved. This power reduction may be especially important for mobile applications, such as Gigabit LAN/Wireless LAN controllers or any other mobile Si-based components where power reduction in the idle state is directly related to the extension of battery life.

The foregoing description is intended to be illustrative and not limiting. Variations will occur to those of skill in the art. For example, the component may be made of any semiconductor material that has behavior characteristics similar to that of a silicon material, such as gallium arsenide. Those variations are intended to be included in the various embodiments of the invention, which are limited only by the spirit and scope of the appended claims.

What is claimed is:

1. A device for reduction of power of electrical components comprising:
   a chip as an electrical component;
   means for measuring temperature of the chip; and
   means for regulating an operating voltage of the chip based on the measured temperature of the chip wherein when said means for measuring the temperature of the chip senses a chip temperature that is less than a predetermined threshold temperature value which represents an idle state of the chip that is a low power state of the chip, said means for regulating the operating voltage of the chip changes the operating voltage of the chip to a minimum allowed voltage value at its idle state, wherein the threshold temperature representing the idle state of the chip is determined based on component speed characteristics of the chip and wherein the minimum allowed voltage and the threshold temperature maintain the component speed characteristics of the chip, while providing significant reduction in power consumption of the chip.

2. The device according to claim 1, wherein the chip is a silicon-based component.

3. The device according to claim 2, wherein the chip is one of a Si component, a Si-germanium component, a gallium arsenide component or other semiconductor component.

4. The device according to claim 1, wherein said means for measuring the temperature of the chip comprises a thermocouple.

5. The device according to claim 1, wherein said means for measuring the temperature of the chip comprises a thermal diode.

6. The device according to claim 1, wherein said means for regulating the operating voltage of the chip comprises an external voltage regulator.

7. The device according to claim 1, wherein said means for regulating the operating voltage of the chip comprises an internal linear/switched voltage regulator.

8. The device according to claim 1, wherein said means for regulating the operating voltage comprises firmware.

9. A device for reduction of power of electrical components comprising:
   a chip as an electrical component;
   a thermometer that outputs temperature of said chip;
   a voltage regulator coupled to the output of the thermometer and to the chip wherein said voltage regulator reduces operating voltage of the chip when the output of the thermometer is less than a threshold temperature representing an idle state of the chip that is a low power state of the chip and said voltage regulator reduces the operating voltage of the electrical component to a minimum allowed voltage value in its idle state when the sensed temperature is below the threshold temperature, wherein the threshold temperature representing the idle state of the chip is determined based on component speed characteristics of the chip and wherein the minimum allowed voltage and the threshold temperature maintain the component speed characteristics of the chip, while providing significant reduction in power consumption of the chip.

10. The device according to claim 9, wherein the chip comprises one of silicon, silicon germanium, gallium arsenide, or other semiconductor material.

11. The device according to claim 9, wherein said thermometer comprises a thermal diode.

12. The device according to claim 9, wherein said voltage regulator comprises an external voltage regulator.

13. The device according to claim 9, wherein said voltage regulator comprises an internal linear/switched voltage regulator.

14. The device according to claim 9, wherein said voltage regulator regulates the operating voltage of the chip using firmware.

15. The device according to claim 9, further comprising a card on which at least two chips are disposed where the thermometer measures the temperature of each chip and the voltage regulator reduces the operating voltage of each respective chip when the measured temperature of the respective chip is less than the respective threshold temperature.

16. The device according to claim 9, further comprising a card on which at least two chips are disposed where the thermometer comprises an individual thermometer to measure the temperature of each chip and the voltage regulator comprises individual chip specific voltage regulators that are respectively associated with one of the at least two chips so that the operating voltage of the at least two chips is reduced when the output of the respective, individual thermometer is less than the respective threshold temperature.

17. The device according to claim 9, further comprising a card on which at least two chips are disposed where the thermometer measures the temperature of each chip and the voltage regulator comprises individual chip specific voltage regulators that are respectively associated with one of the at least two chips so that the operating voltage of the at least two chips is reduced when the output of the respective, individual thermometer is less than the respective threshold temperature.

18. The device according to claim 17, wherein a first voltage regulator reduces the operating voltage of at least two chips and a second voltage regulator reduces the operating voltage of another chip.

19. A method for reduction of power of electrical components, comprising:
measuring temperature of a chip or electrical component while the chip is ON; and
reducing an operating voltage delivered to the chip to a minimum allowed voltage when the measured temperature of the chip drops below a predefined threshold temperature representing an idle state of the chip that is a low power state of the chip wherein the predefined threshold temperature is selected to be a chip temperature below which the chip is presumed to be in the idle state, wherein the threshold temperature representing the idle state of the chip is determined based on component speed characteristics of the chip and wherein the minimum allowed voltage and the threshold temperature maintain the component speed characteristics of the chip, while providing significant reduction in power consumption of the chip.

20. The method according to claim 19, wherein the reduced operating voltage is changed to a nominal operating voltage, when the chip returns to a normal operating mode.

21. A machine-readable storage medium that provides instructions, which when executed by a computing platform, cause said computing platform to perform operations comprising a method for reduction of power of electrical components of:
measuring temperature of an electrical chip while the electrical chip is ON; and
reducing an operating voltage delivered to the chip to a minimum allowed voltage when the measured temperature of the chip drops below a predefined threshold temperature representing an idle state of the chip that is a low power state of the chip, wherein the threshold temperature representing the idle state of the chip is determined based on component speed characteristics of the chip and wherein the minimum allowed voltage and the threshold temperature maintain the component speed characteristics of the chip, while providing significant reduction in power consumption of the chip.

22. The machine-readable storage medium of claim 21, wherein the predefined threshold temperature is selected to be a chip temperature below which the chip is presumed to be in the idle state.

23. The machine-readable storage medium according to claim 21, wherein the reduced operating voltage is changed to a nominal operating voltage, when the chip returns to a normal operating mode.

* * * * *